United States Patent Office 3,518,247
Patented June 30, 1970

3,518,247
BASIC MONOAZO DYES CONTAINING AN N-METHYLPYRIDINIUM, 2- OR 4-DIMETHYLENE GROUP
Rudolf Altermatt, Technau, Basel-Land, and Roland Entschel and Curt Müller, Basel, Switzerland, assignors to Sandoz Ltd. (also known as Sandoz A.G.), Basel, Switzerland
No Drawing. Filed Aug. 20, 1965, Ser. No. 481,404
Claims priority, application Switzerland, Aug. 28, 1964, 11,325/64; Sept. 4, 1964, 11,553/64; July 26, 1965, 10,436/65
Int. Cl. C09b 1/28, 29/36, 51/00
U.S. Cl. 260—156                9 Claims

ABSTRACT OF THE DISCLOSURE

Basic dyestuffs containing an N-methylpyridinium-2-dimethylene group or an N-methylpyridinium-4-dimethylene group are especially useful in dyeing polymeric in dyeing cotton, plastics, polyesters, polyolefins polyamides, paper and especially polyacrylonitrile fibers in very level, even shades which have good fastness to washing, perspiration, sublimation, pleating, decatising, ironing, water, sea water, dry cleaning, cross-dyeing and solvents.

The present invention provides a process for the manufacture of basic dyestuffs of the formula

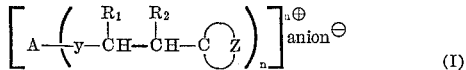

(I)

where:

A represents the residue of a dyestuff that is free from sulphonic acid groups,
$R_1$ represents a hydrogen atom or an alkyl radical which preferably contains 1 to 4 carbon atoms,
$R_2$ represents a hydrogen atom or an alkyl radical which preferably contains 1 to 4 carbon atoms,
y represents the direct bond or a bivalent radical,
Z represents a member of a cyclic system of aromatic character consisting of several, preferably 5 or 6 members, which contains at least one quaternary nitrogen atom and may contain further hetero atoms and further substituents and which may be condensed with further cycloaliphatic, hetero-cyclic or aromatic rings,
$n = 1$ or 2, and
anion $\ominus$ is an anion equivalent to the dyestuff cation.

According to the present process $n$ mol(s) of a compound of the formula

(II)

is/are added on to one mole of a compound of the formula

(III)

where B has the meaning given above for A or represents the residue of a compound capable of forming a dyestuff residue A. In the above Formula III $Z_1$ has the meaning given above for Z or it represents a member of a cyclic system of aromatic character consisting of several members, which contains at least one quaternizable nitrogen atom and may contain further hetero atoms and further substituents and which may be condensed with further cycloaliphatic, heterocyclic or aromatic rings, and when B in the reaction product represents the residue of a compound capable of forming a dyestuff B is so converted and, if desired or required, the reaction product is quaternated. The quaternation and the conversion into a dyestuff may be performed in either order of succession.

Compounds of the Formula III are, for example:
2-vinylpyridines or 4-vinylpyridines; 4-vinylpyrimidine, 2-vinylquinoline, 1-vinylisoquinoline, 4-vinylquinoline, 3-vinylquinaldine, 2-vinylthiazole, 2-vinylbenzthiazole, 4-methyl-2-vinylthiazole; 4,5 - dimethyl - 2 - vinylthiazole, 4-phenyl-2-vinylthiazole, 4-methyl-2-(α-methylvinyl)-thiazole, 2-vinylbenzimidazole, 2-vinylbenzoaxazole, 2-vinylimidazole, 1-methyl-2-vinylimidazole, 5-ethyl-2-vinylpyridine, 2-methyl-4-vinylthiazole, 2-propenylpyridine; 4-propenylpyridine, 2-propenylquinoline, 2-propenylpyrimidine, 4 - propenyl - 2 - phenylquinoline, 2-methyl-5-vinylpyridine, 2-methyl-6-vinylpyridine and 2-vinylpyrazine.

As dyestuffs that are free from sulphonic acid groups there may be used, for example, those of the following series:
Nitroso, nitro, styryl, stilbene, di- and triarylmethane, methine, polymethine, sulphur, anthraquinone, phthalocyanine, metalliferous phthalocycanine, quinonimine, azine, oxazine, dioxazine, thiazine, perinone, naphthoquinone, indigo, quinophthalone, pyrazolone, aminopyrazole, xanthene, acridine, quinoline, cyanine, azomethine, or especially of the possibly substituted monazo or possibly substituted disazo or polyazo series. Further suitable are possibly substituted monoazo, disazo and polyazo dyestuffs that contain metal atoms in a coordinative bond.

The dyestuff residue A of the afore-mentioned dyestuffs may contain additionally a cycloimmonium group or an external ammonium, isothiouronium or hydrazinium group.

Dyestuffs that contain at least one of the aforementioned groups have been described, for example, in German specification No. 1,011,396 (filed on Dec. 29, 1955) and No. 1,044,023 (filed on Dec. 14, 1955), in German Auslegeschrift No. 1,045,969 (filed on Feb. 8, 1956); in Belgian specifications No. 630,895 (filed on Apr. 10, 1963), No. 633,477 (filed on June 1963), No. 638,438 (filed on Oct. 9, 1963), No. 639,981 (filed on Nov. 14, 1963), No. 645,280 (filed on Mar. 16, 1964); in French specification No. 1,325,176 (filed on Apr. 20, 1962) and in French patent of addition No. 81,967 to French specification No. 1,325,176 (filed on Apr. 21, 1962).

For the synthesis of the dyestuff A there are preferably used compounds which can be converted into azo dyestuffs by reaction with diazonium salt. The azo coupling is carried out in known manner, advantageously in a weakly alkaline to acid medium which, if desired, may be buffered. Further suitable as compounds B are those which contain a functional group or a group convertible thereinto or a reactive hydrogen atom, the said compound being reacted with a component used for synthesizing the dyestuff A, for example by way of a condensation reaction.

Some of the new dyestuffs, or some intermediates suitable for forming these dyestuffs, can be obtained, for example, by first adding a compound of the Formula III on to ammonia or a primary amine to form a compound
of the formula

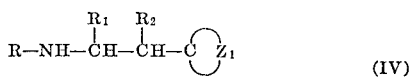     (IV)

where R represents a hydrogen atom or a possibly substituted hydrocarbon residue, for example a possibly substituted alkyl, aryl (such as phenyl or naphthyl), aralkyl or cyclohexyl radical, whereupon the resulting compound of the Formula IV is reacted with a dyestuff or dyestuff intermediate containing a reactive group, for example a group capable of condensation such, for example, as an —$SO_2Cl$, —$SO_2Br$, —COCl or —COBr group.

The afore-mentioned additive reaction may also be performed with salts of ammonia or of primary amines.

The symbol anion $\ominus$ may represent an organic or inorganic ion, for example, methylsulphate, sulphate, disulphate, perchlorate, phosphotungstic molybdate, benzenesulphonate, 4-chlorobenzenesulphonate, oxalate, maleinate, acetate, propionate, methanesulphonate, chloroacetate, benzoate or complex anions, for example the anion of zinc chloride double salts.

Particularly suitable bridge members y are the atomic groupings:

Hydrocarbon residue
|
—N—

—NH—, —O—, —S—, possible linked through alkylene, alkenylene, aralkylene, arylene such, for example, as —$(CH_2)_p$—O—, —$(CH_2)_p$—S—,

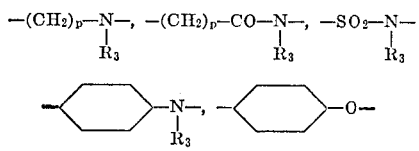

where p is a number from 0 to 3 and $R_3$ represents a hydrogen atom or a lower unsubstituted or substituted alkyl radical or an unsubstituted or substituted aryl or acyl radical.

Possibly substituted hydrocarbon residues are possibly substituted alkyl, phenyl, naphthyl or cycloalkyl radicals such, for example, as methyl, ethyl, propyl, butyl, hydroxyethyl, chloroethyl, cyanethyl, cyclohexyl and the like.

Preferred acyl radicals correspond to the formula $R_4$—$SO_2$— or $R_4$—CO—, where $R_4$ represents hydrogen or an aromatic or a saturated or unsaturated aliphatic or cycloaliphatic residue. Suitable acyl radicals are, for example, formyl, acetyl, propionyl, butyryl, acryloyl, cyanoacetyl, dimethylaminoacetyl, methylsulphonyl or a possibly substituted phenylsulphonyl group.

Alkylating agents suitable for the quaternation of the hetero ring

are, for example, esters of strong mineral acids and of organic sulphonic acids, such as alkylchlorides, alkylbromides and alkyliodides or alkylsulphates, such, for example, as methyl iodide, methyl bromide, methyl chloride, dimethyl sulphate, aralkyl halides, α-halogenated esters of lower alkanesulphonic acids, such, for example, as methanesulphonic, ethanesulphonic or butanesulphonic acid, and esters of benzenesulphonic acids which may be further substituted, such as methyl, ethyl, propyl and n-butyl esters of benzenesulphonic acid, of 2- or 4-methylbenzene sulphonic acid, 4-chlorobenzenesulphonic acid or 3- or 4-nitrobenzene sulphonic acids.

Alkylation is preferably performed in an inert solvent or alternatively in an aqueous suspension, or in the absence of a solvent in an excess of the alkylating agent at a temperature about —10° C., and, if desired, in a buffered medium. The reaction of a compound of the Formula II with a compound of the Formula III is advantageously performed, if desired or required, in the heterogeneous liquid phase in the presence of a catalyst, for example of a saturated fatty acid containing 1 to about 5 carbon atoms, such as formic, acetic, propionic, butyric or isobutyric acid; their alkyl esters, such as ethyl acetate or ethyl propionate; their anhydrides, such as acetic or propionic anhydride; or their heavy-metal salts, such as copper, zinc, cobalt or nickel formate or acetate; of a polyol, such as glycerol; a glycol such as ethyleneglycol; a phenol itself, meta cresol or para-cresol or a cresol mixture; of an alcohol; or of a salt of a strong acid with an amine or ammonia, for example ammonium chloride, or aniline hydrochloride; in certain cases even water may act as a catalyst. When both compounds (II) and (III), are at the reaction temperature, liquid or capable of dissolving or liquefying each other, the process may be performed without a solvent in the presence of 0.1% to 10% of catalyst, or a solvent may be used additionally. Suitable solvents are the aforementioned catalysts, provided they are liquid and do not cause any side reaction, for example an acylation of an amino group, as well as inert solvents, such as aromatic hydrocarbons which may contain haloyen atoms or nitro or alkoxy groups. When solid starting materials are used, a solvent is in most cases absolutely necessary to ensure a smooth progress of the reaction. Suitable temperatures are within the range from about 50° to 150° C., preferably from about 80° to 130° C.; they depend on the reactivity of the reactants and on the catalyst used. When acetic acid of 100% strength is used, the most favourable temperature range in from 100° to 120° C., the reaction taking a few hours under these conditions.

The resulting dyestuffs or intermediates can be isolated and, if necessary purified, by the conventional basic operations, such as evaporation, precipitation, distillation, filtration, decantation or the like; if they are obtained in a sufficiently pure form, they can be used as they are.

The conversion of the intermediates into dyestuffs is preferably carried out by way of the azo coupling reaction, and the group

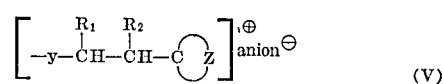     (V)

may be present in the azo and/or in the diazo component.

The azo dyestuffs accessible by the present invention may belong, for example, to the following series: Benzeneazobenzene, benzene - azonaphthalene, naphthalene - azonaphthalene, benzene - azopyrazolone, benzene - azoaminopyrazole, benzene - azoacylacetic acid arylamide, the heterocyclic series, for example to the thiazole-azobenzene, thidiazole - azobenzene, thiadiazole - azonaphthalene or to the thiadiazole-azopyrazolone series or the like.

Preferred substituents in these azo compounds, or if desired in other dyestuffs, are those which are usual in dyestuffs for acetate rayon and polyesters, namely: hydroxyl; halogen, such as chlorine, bromine, fluorine; the nitrile or nitro group; possibly substituted alkyl, alkylsulphonyl, sulphonamide, carboxylic acid amide, lower alkoxy or car(lower)alkoxy groups; also the carboxylic acid group and esters of the carboxylic acid and sulphonic acid group, and the like.

As mentioned above, the symbol A may represent the residue of a possibly substituted monoazo, disazo or polyazo dyestuff and possibly contain coordinatively bound metal atoms, such as Fe, Co, Cu, Ni, Cr, Mn or others; they can form 1:1- or 1:2-metal complexes.

The grouping of the Formula V in the azo dyestuffs may be linked through an amino group bound with a phenyl or naphthyl residue, for example:

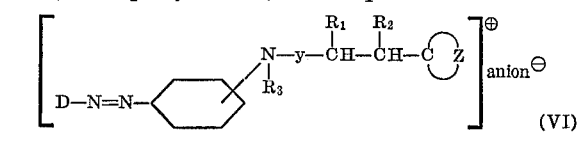

or

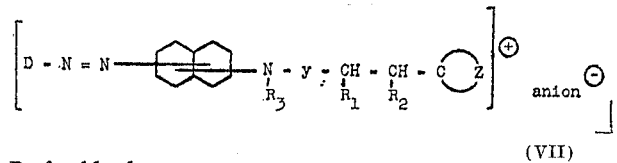

Preferably the

is in para-position to the azo bridge.

Alternatively, the group of the Formula V may be linked with a phenyl or naphthyl residue through an oxy group, for example:

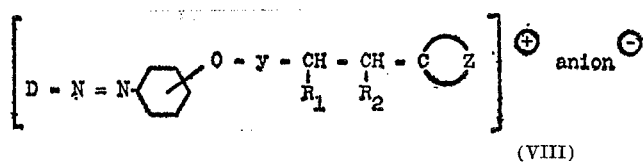

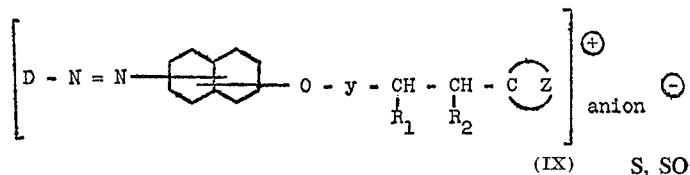

When the coupling component chosen is a pyrazolone or aminopyrazolone derivative, the grouping of the Formula V may be linked, for example, as follows:

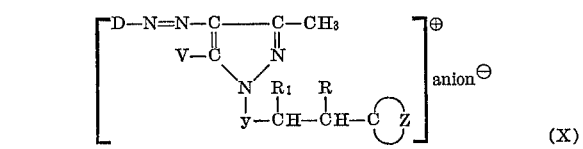

or

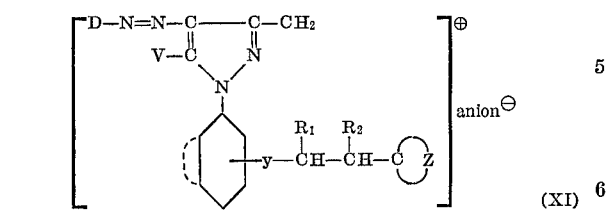

where V represents the amino or the hydroxyl group. However, as mentioned above, the group of the Formula V may also be present in the diazo component. In such a case there are obtained dyestuffs of the general formula, for example:

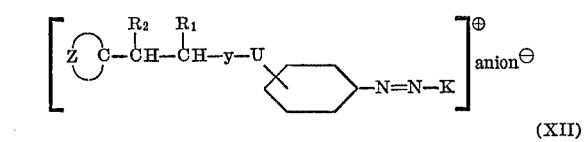

where U represents —CO— or —SO$_2$—.

The symbols D and K in the Formulae VI to XII represent possibly substituted diazo or coupling components, with the proviso that the diazo and/or the coupling component may, as such, already be azo dyestuffs.

Alternatively, the grouping of the Formula V may be linked with a heterocyclic nitrogen atom of a compound of the tetrahydroquinoline, indole, dihydroindole or carbazole series.

The symbol A may represent the residue of a dyestuff whose molecule contain at least once the structure

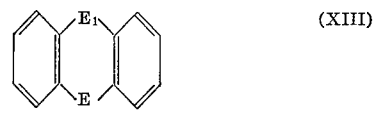

where $E_1$ represents C=O or NH, and $E_2$ stands for C=O, S, SO, SO$_2$, NH or O. To this group belong in the first place anthraquinones, also thioxanthones, benzophenonesulphones, xanthones, azines, thiazines and their substitution and condensation products; as the latter there are suitable meso-ring compounds, annellated and differently condensed cyclic systems.

As examples of anthraquinone dyestuffs there may be mentioned: 1-amino- or 1-alkylamino- or 1-arylamino-4-arylaminoanthraquinones, 1-amino-2-aryloxy- or -2-alkoxy-4-aryl- or -4-alkylaminoanthraquinones, in which the anthraquinone and/or the alkylamino or arylamino residue, e.g. the phenylamino or naphthylamino residue, may carry further substituents, e.g. possibly substituted alkyl, alkoxy, hydroxyl, halogen (such as chlorine, bromine or fluorine), nitro, sulphonamine, sulphone, alkylsulphonyl, azoamino or acylamino, cyclohexyl or cyclohexylamino or similar groupings.

In compounds of the Formula XIII the grouping of the Formula V may be bound with the molecule of the Formula XIII, for example, through a nuclear-bound amino group, for example

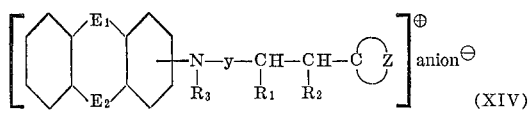

or to a phenylamino group, for example

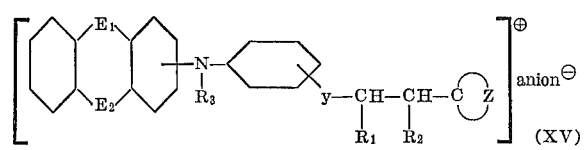

Alternatively, the grouping of the Formula V may be bound with the molecule of the Formula XIII, for example, as follows:

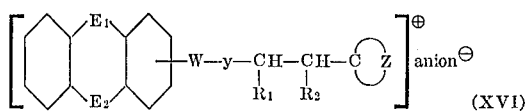

or

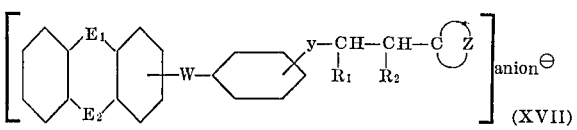

where W stands for —O— or —S—.

The new dyestuffs are used in the first place for dyeing, padding or printing fibres, filaments or textile materials made therefrom; said textile materials may consist of or contain acrylonitrile polymers or copolymers. The shades obtained are strong, have good properties of fastness to light and wet treatment and especially good fastness to washing, perspiration, sublimation, pleating, decatising, ironing, water, sea water, dry cleaning, cross-dyeing and solvents. In addition, they display good stability towards salt and are readily soluble, especially in water.

The term acrylonitrile polymers includes above all those which contain more than 80% of acrylonitrile. Acrylonitrile copolymers are quite generally copolymers consisting of 80 to 95% of acrylonitrile and 20 to 5% of vinyl acetate, vinyl pyridine, vinyl chloride, acrylic acid, acrylic acid esters, methacrylic acid, methacrylic acid esters or the like.

Such textile materials are known under the following trademarks, some of which are registered: Acrylon 1656 (copolymer from 85% of acrylonitrile and 15% of vinyl acetate or vinyl pyridine) Creslan, Orlon 44, Crylor HH, Leacril N, Dynel Exlan, Vonnel, Verel, Zefran, Wolcrylon, Ssaniw, also Orlon 42, Dralon, Courtelle and others.

The afore-mentioned fibres can also be dyed in admixture with others. In general, dyeing is carried out in an aqueous alkaline, neutral or acidic medium at a temperature from 80° to 100° C., advantageously at the boil or at a temperature above 100° C. under superatmospheric pressure.

The shades obtained by the present process are very level, even when no retarder is used. Blend fabrics containing a share of polyacrylonitrile fibres likewise lend themselves very well to dyeing by the present process. The dyestuffs of the above definitions are also suitable for dyeing polyacrylonitrile in the mass shades that are last to light and wetting and also for dyeing oils, lacquers, plastic masses, plastic materials and solutions thereof to be used for spinning filaments, as well as polyesters or polyolefine modified by acid groups.

The new dyestuffs may further be used for dyeing cotton, such as tanned cotton, wool, silk, cellulose (e.g. regenerated cellulose), synthetic polyamide fibres and paper at any stage of its manufacture, as well as leather. It has also proved advantageous to use mixtures of two or more dyestuffs of the Formula I.

Parts and percentages in the following examples are by weight.

EXAMPLE 1

A mixture of 23.4 parts of 4-vinylpyridine, 24.2 parts of ethylaminobenzene and 12 parts of acetic acid of 100% strength is stirred for about 6 hours at 110° C. The acetic acid, the excess 4-vinylpyridine and any residual ethylaminobenzene are then distilled off at 70° C. under a pressure of 15 mm. Hg. The resulting N-ethyl-N-[β-(pyridyl-4')-ethyl]-aminobenzene is sufficiently pure for the preparation of dyestuffs. In the meantime a diazonium salt solution is prepared in the following manner: 17.2 parts of 1-amino-2-chloro-4-nitrobenzene are stirred for 3 hours at room temperature in a mixture of 60 parts of water and 40 parts of concentrated hydrochloric acid. The resulting suspension is cooled by adding 100 parts of ice to it and then diazotized at 0° to 5° C. within 2 hours with a solution of 6.9 parts of sodium nitrite in 100 parts of water. The batch is stirred for another 15 minutes, and the resulting solution is mixed with 10 parts of aminosulphonic acid and filtered. The clear diazonium salt solution is mixed with a solution of 22.6 parts of N-ethyl-N-[β-(pyridyl-4')-ethyl]-aminobenzene in 50 parts of glacial acetic acid and the coupling reaction is finalized in an acidic medium by adding sodium acetate until a pH value of 4 has been reached. The dyestuff is suctioned off, washed free from acid and dried. The dry dyestuff is dissolved in 500 parts of acetone. The resulting solution is mixed at room temperature with 14.2 parts of methyl iodide and left to itself for 3 hours, during which the quaternary dyestuff precipitates quantitatively in pure form; it is filtered off and dried. After having been recrystallized from alcohol it melts at 179° C. It corresponds to the formula

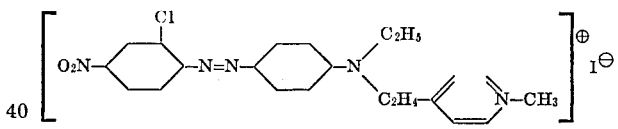

and dyes polyacrylonitrile fibres ruby red shades having good properties of fastness.

The identical dyestuff is also obtained when N-ethyl-N-[β-pyridyl-4')-ethyl]-aminobenzene is dissolved in benzene, treated with diethyl sulphate and the precipitated quaternated product is coupled with the diazonium salt described.

Dyeing instruction 20 parts of the dyestuff obtained as described in Example 1 are intimately mixed with 80 parts of dextrin for 48 hours in a ball mill. 1 part of the resulting preparation is pasted with 1 part of a 40% acetic acid solution, the magma is covered with 400 parts of distilled water heated at 60° C. while being continuously agitated, and the whole is boiled for a short time, then diluted once more with 7600 parts of distilled water and 2 parts of glacial acetic acid are added, whereupon 100 parts of "Orlon" (registered trademark) are immersed in this dyebath at 60° C. (The "Orlon" material had been pretreated for 10 to 15 minutes at 60° C. in a bath of 8000 parts of water and 2 parts of glacial acetic acid.) The bath and its content are then heated within 30 minutes to 100° C., boiled for one hour and rinsed. The resulting level ruby red dyeing possesses good properties of fastness.

EXAMPLE 2

A mixture of 23.4 parts of 4-vinylpyridine, 28.6 parts of 1-aminonaphthalene and 24 parts of acetic acid of 100% strength is stirred for 6 hours at 100° to 105° C., then allowed to cool to room temperature, poured over 400 parts of ice water and neutralized with 30 parts of sodium bicarbonate. The liquid 1-[β-(pyridyl-4')-ethyl]- aminonaphthalene is isolated in a separating funnel and washed with water. In the meantime a diazo solution is prepared as described in Example 1. The filtered, clear diazonium salt solution is mixed with a solution of 24.8 parts of 1-[β-(pyridyl-4′)-ethyl]-aminonaphthalene in 100 parts of glacial acetic acid and the coupling reaction is finalized by stirring the acid reaction mixture for several hours. The precipitated dyestuff is suctioned off, washed free of acid and dried. The dry dyestuff is dissolved at the boil in 200 parts of chlorobenzene, and the resulting solution mixed with 14.2 parts of methyl iodide and kept for 1 hour at 60° C., during which the quaterated dyestuff precipitates quantitatively. The resulting basic dyestuff is filtered off and dried. In the crude form it melts at 220° C. and dyes polyacrylonitrile fibres violet shades. The time taken by the coupling reaction can be substantially reduced by buffering the coupling mixture to a pH value of 4.0 to 4.5 by adding sodium acetate or sodium carbonate to it. Instead of the isolated 1-[β-(pyridyl-4′)-ethyl]-aminonaphthalene the whole condensation mixture as such may be used directly for the coupling reaction.

EXAMPLE 3

6.9 parts of powdered sodium nitrite are vigorously stirred at 60° to 70° C. into 120 parts of concentrated sulphuric acid. The solution is stirred further for 10 minutes at 60° C., then cooled to 10° C., and 100 parts of glacial acetic acid and then 16.3 parts of 1-amino-2-cyano-4-nitrobenzene and 100 parts of glacial acetic acid are added at 10° to 20° C. The batch is stirred further for 2 hours and the resulting diazonium salt solution is then poured into a mixture of 24.8 parts of 1-[β-(pyridyl-4′)-ethyl]-aminonaphthalene, 100 parts of glacial acetic acid, 10 parts of aminosulphonic acid and 200 parts of ice. The coupling reaction is finalized in an acid medium by buffering to pH=3.5 to 4.0 with sodium acetate. The dyestuff forms spontaneously and precipitates; it is filtered off, washed free from acid and dried. The dry dyestuff is dissolved at 131° C. in 2000 parts of chlorobenzene. The resulting solution is clarified by filtration and then mixed at 60° C. with 14.2 parts of methyl iodide. The reaction mixture is heated for 1 hour at 60° C., whereupon a quantitative precipitate of the quaternated dyestuff is obtained; it is filtered off and dried. It melts at 192° C. and dyes polyacrylonitrile fibres blue shades.

EXAMPLE 4

6.9 parts of sodium nitrite are slowly added with vigorous stirring at 60° to 70° C. to 140 parts of concentrated sulphuric acid. The solution is stirred further for 10 minutes at 60° C., then cooled to 10° C., and 26.2 parts of 1-amino-2-bromo-4,6-dinitrobenzene are added. After 3 hours the diazotization reaction is complete. The diazo solution is mixed with 8 parts of urea and stirred for 15 minutes at 10° C. The resulting diazonium salt solution is poured into a cold mixture of 24.8 parts of [1-β-(pyridyl-4′)-ethyl]-aminonaphthalene, 50 parts of glacial acetic acid and 200 parts of ice. The coupling reaction is finalized in an acid medium buffered with sodium acetate. The dyestuff forms immediately and precipitates; it is filtered off, washed free from acid and dried. The dry dyestuff is dissolved at 131° C. in 2000 parts of chlorobenzene. The resulting solution is clarified by filtration and then mixed at 60° C. with 14.2 parts of methyl iodide. The reaction mixture is heated for 1 hour at 60° C., whereupon the basic dyestuff separates out quantitatively. The resulting dyestuff of the formula

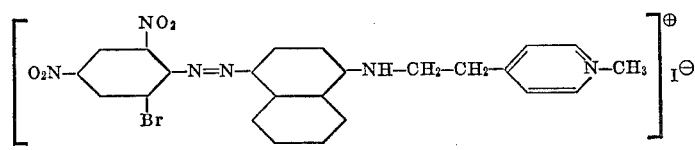

is filtered off and dried. It melts at 211° C. and dyes polyacrylonitrile fibres blue shades.

EXAMPLE 5

310 parts of 1-amino-4-methylaminoanthraquinone are added to a solution of 150 parts of 2-vinylpyridine in 500 parts of glacial acetic acid, and the resulting suspension is heated to 120° C. and stirred for 6 hours at 120° C. When the reaction is complete, the batch is allowed to cool to 30° C. and diluted with 1000 parts of water. The precipitated dyestuff is filtered off, washed with cold water and dried. For quaternation 10 parts of the dry dyestuff are pasted in 40 parts of dimethylformamide, 3.7 parts of dimethylsulphate are added, and the mixture is stirred for 20 hours at 40° C. and then poured into 500 parts of water. The resulting solution is clarified by filtration and the dyestuff salted out with 25 parts of sodium chloride, filtered off and dried.

EXAMPLE 6

A suspension of 86 parts of 1-methylamino-4-(4′-aminophenylamino)-anthraquinone in 200 parts of glacial acetic acid is heated to 80° C., and at this temperature 52 parts of 2-vinylpyridine are dropped in within 3 hours. When the additive reaction is complete—which can be verified by chromatography—the reaction mixture is diluted with a solution of 200 parts of glacial acetic acid in 400 parts of water, and at 30° C. the precipitated dyestuff of the formula

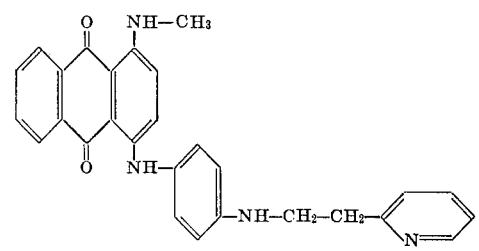

is suctioned off, washed with cold water and dried. The dyestuff is quaternated as described in Example 5; it dyes polyacrylonitrile fibres fast greenish blue shades.

EXAMPLE 7

48 parts of 4-vinylpyridine are added at 50° C. to a solution of 24.2 parts of 4-nitro-4′-monoethylamino-1,1′-azobenzene in a mixture of 73 parts of glacial acetic acid, 390 parts of methanol and 95 parts of acetone. After one hour the batch is heated to 90° C. and maintained for 6 hours at this temperature, then allowed to cool, and the precipitated dyestuff formed is filtered off and dried. After recrystallization from alcohol+acetone the resulting dyestuff of the formula

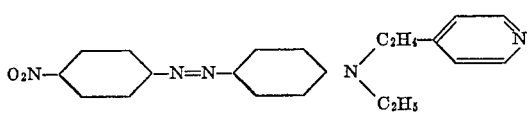

melts at 177° C.; it is dissolved in acetone and treated with methyl iodide as described in Example 1, to yield a dyestuff of the formula

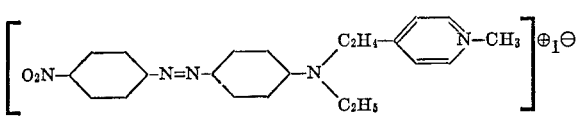

which dyes polyacrylonitrile fibres red shades having good properties of fastness.

EXAMPLE 8

(a) 2-vinylpyridine is reacted with ammonium chloride in an aqueous medium at the boil. 134 parts of the resulting 2-β-aminoethylpyridine are mixed with 92 parts of sodium bicarbonate and condensed with 234 parts of acetyl-sulphanilic acid chloride, and the condensate is hydrolyzed by heating in hydrochloric acid of 10% strength. 28 parts of the resulting compound of the formula

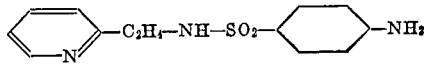

are mixed with 100 parts of water, 42 parts of concentrated hydrochloric acid and 50 parts of ice, and the mixture is diazotized with 25 parts of 4 N-sodium nitrite solution, then coupled with a mixture of 18.5 parts of 1-phenyl-3-methylpyrazolone, 150 parts of glacial acetic acid and 70 parts of sodium acetate, and the dyestuff formed is filtered off, washed with water, dried and quaternated with dimethylsulphate in dimethylformamide at 80° C. The resulting dyestuff of the formula

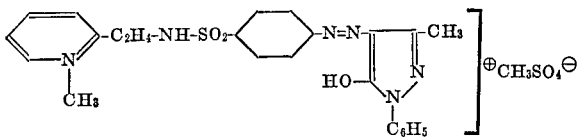

dyes polyacrylonitrile fibres extremely fast yellow shades. In an analogous manner the dyestuff of the formula (b)

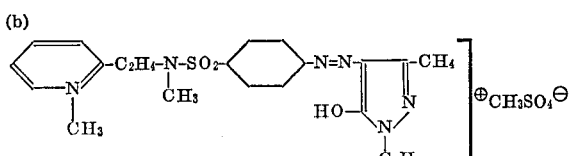

is obtained which has an excellent capacity for absorption.

EXAMPLE 9

10.3 parts of 1-amino-2,6-dichloro-4-nitrobenzene are diazotized in 50 parts by volume of n-nitrosylsulphuric acid; the resulting solution is slowly dropped at 0° C. into a solution of 17.5 parts of the compound of the formula

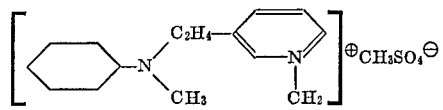

in 200 parts of water; the coupling reaction is finalized by partial neutralization with aqueous sodium hydroxide solution, and the resulting dyestuff of the formula

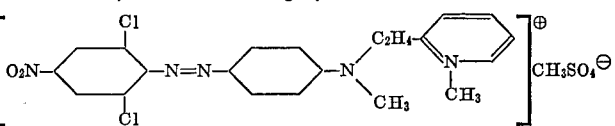

is isolated. It dyes polyacrylonitrile fibres fast yellowish brown shades.

The azo component used is prepared in the following manner: 21 parts of 2-vinylpyridine are dissolved in 200 parts of benzene, 28 parts of dimethylsulphate are dropped in and the mixture is stirred and heated for 5 hours at 30° C., whereupon the precipitated quaternated product is separated, immediately added to a mixture of 20 parts of N-methylaminobenzene and 40 parts of glacial acetic acid, and the mixture is heated for 4 hours at 80° C., then allowed to cool, diluted with water, filtered, and the filtrate thus obtained is used for the dystuff synthesis at it is.

The identical azo compound is also obtained when N-methylaminobenzene is first reacted in glacial acetic acid with 2-vinylpyridine and the reaction product is then quaternated with dimethylsulphate. The following table lists further dyestuffs prepared according to this invention as described in Examples 1 to 4 and 7 to 9; they correspond to the general formula (XVIII)      [D—N=N—K]⊕anion⊖ where D represents the residue of a diazo component and K the residue of a coupling component. Suitable anions⊖ are those shown in the foregoing description.

The symbols $T_1$ and $T_2$ used in the following tables mean:

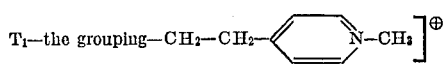

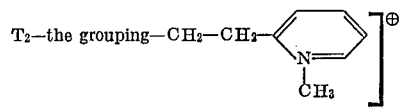

In each example shown in the tables the residue $T_1$ may be replaced by $T_2$ and vice versa.

TABLE 1

| Ex. No. | Residue of the diazo component | Residue of the coupling component | Shade obtained on "Orlon" |
|---|---|---|---|
| 10 | 4-O₂N, 2-CN, 5-Cl-phenyl | 6-(NH-T₁)-naphthalen-2-yl | Bluish red. |
| 11 | 4-(H₃C—SO₂)-2-Cl-phenyl | 4-[N(C₂H₄CN)(T₁)]-phenyl | Scarlet. |
| 12 | 2-Cl-phenyl-N=N-(4-OCH₃)-phenyl | 3-methyl-5-hydroxy-1-T₁-pyrazol-4-yl | Orange. |
| 13 | 4-(CH₃—CO)-phenyl | 3-methyl-5-hydroxy-1-T₁-pyrazol-4-yl | Yellow. |
| 14 | 4-O₂N-phenyl | 3-methyl-5-amino-1-T₁-pyrazol-4-yl | Do. |
| 15 | 4-O₂N-2-Cl-phenyl | 5-(N-T₂)-indolin-yl | Red. |
| 16 | 2-CN-5-Cl-phenyl | 3-(N-T₁)-carbazol-yl | Do. |
| 17 | 4-(H₃C—CO)-phenyl | 2-methyl-1-T₁-indol-5-yl | Yellow. |
| 18 | 2,5-diCN-phenyl | 4-N(C₂H₅)₂-3-(O—T₁)-phenyl | Red. |
| 19 | 2-(CH₃—O₂S)-thiazol-5-yl | 4-[N(C₂H₅)(T₁)]-phenyl | Do. |
| 20 | 4-O₂N-2-Cl-phenyl | 4-[N(C₂H₅)(T₂)]-phenyl | Do. |
| 21 | 4-O₂N-2-Cl-phenyl | 4-[N(C₂H₅)(T₁)]-3-CH₃-phenyl | Claret. |
| 22 | 4-O₂N-2-CN-phenyl | 4-[N(C₂H₅)(T₁)]-phenyl | Do. |
| 23 | 4-O₂N-2-CN-phenyl | 4-[N(C₂H₅)(T₁)]-3-CH₃-phenyl | Violet. |

TABLE 1.—Continued

| Ex. No. | Residue of the diazo component | Residue of the coupling component | Shade obtained on "Orlon" |
|---|---|---|---|
| 24 | $O_2N-\langle\rangle-$ with $NO_2$, $Br$ | $-\langle\rangle-N(C_2H_5)(T_1)$ | Blue. |
| 25 | $O_2N-\langle\rangle-$ with $NO_2$, $Br$ | $-\langle\rangle-N(C_2H_5)(T_1)$, $CH_3$ | Do. |
| 26 | $O_2N-\langle\rangle-$ with $Cl$ | $HO-C=C-CH_3$, $-C-N-$ (ring with $N-T_2$) | Reddish yellow. |
| 27 | $O_2N-\langle\rangle-$ | Same as above | Yellow. |
| 28 | $\langle\rangle-$ with $NO_2$ | Same as above | Do. |
| 29 | $H_3C-CO-\langle\rangle-$ | Same as above | Do. |
| 30 | $O_2N-\langle\rangle-$ with $NO_2$, $Br$ | $-\langle\rangle-N(C_2H_5)(T_1)$ | Violet. |
| 31 | $O_2N-\langle\rangle-$ with $SO_2CH_3$ | $-\langle\rangle-N(C_2H_5)(T_1)$, $CH_3$ | Red violet. |
| 32 | $O_2N-\langle S\rangle-C-$ (thiazole with N) | $-\langle\rangle-N(C_2H_5)(T)$, $CH_3$ | Blue. |
| 33 | $O_2N-\langle\rangle-$ with $SO_2CH_3$, $NO_2$ | Same as above. | Blue violet. |
| 34 | id. | $-\langle\rangle-N(C_2H_4OH)(T_1)$, $CH_3$ | Do. |
| 35 | $O_2N-\langle\rangle-$ with $CN$ | $-\langle\rangle-N(C_2H_4OH)(T_1)$, $CH_3$ | Claret. |
| 36 | $O_2N-\langle\rangle-$ with $Cl$, $Cl$ | $-\langle\rangle-N(C_2H_5)(T_1)$, $CH_3$ | Brown. |

The following table lists further dyestuffs accessible by the present process as described in Example 5; they correspond to the formula (XIX) 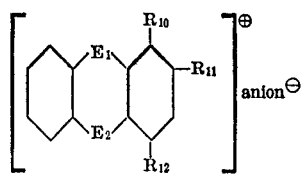

where $E_1$, $E_2$, $R_{10}$, $R_{11}$ and $R_{12}$ have the meanings shown in the table. The anion⊖ may be any one of those mentioned in the foregoing description.

TABLE 2

| Ex. No. | $E_1$ | $E_2$ | $R_{10}$ | $R_{11}$ | $R_{12}$ | Shade obtained on "Orlon" |
|---|---|---|---|---|---|---|
| 37 | $SO_2$ | CO | $CH_3$ | H | NH—⟨⟩—NH—$T_1$ | Orange. |
| 38 | CO | S | NH—$T_1$ | H | $CH_3$ | Do. |
| 39 | CO | CO | $NH_2$ | O—⟨⟩—$CH_2$—NH—$T_2$ | OH | Red. |
| 40 | CO | CO | $NH_2$ | Br | NH—$T_1$ | Reddish blue. |
| 41 | CO | CO | $NH_2$ | $CH_3$ | NH—⟨$SO_2NH$—$T_2$⟩—$CH_3$ | Do. |
| 42 | CO | CO | OH | H | NH—$T_2$ | Red violet. |

EXAMPLE 43

0.1 mol each of 4-chloro-3-nitrobenzenesulphonyl chloride and 2-(β-aminoethyl)-pyridine [obtained by boiling 2-vinylpyridine in aqueous ammonium chloride solution] are stirred in 100 parts of water for 3 hours at 35° to 40° C., and towards the end of the reaction 5 parts of calcium carbonate are added. The resulting suspension is mixed with 19 parts of aminobenzene and 20 parts of calcium carbonate, the mixture is heated for 9 hours at 100° C., and the dyestuff thus formed is isolated, dissolved in acetone and quaternated with methyl iodide. The resulting corresponds of the formula

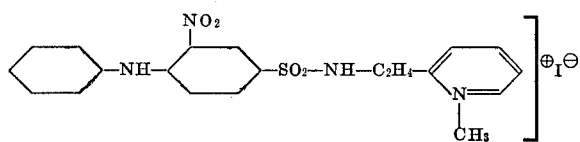

and forms a yellow powder which from aqueous solution produces a very fast yellow shade on polyacrylonitrile.

The dyestuff of the formula (Example 44)

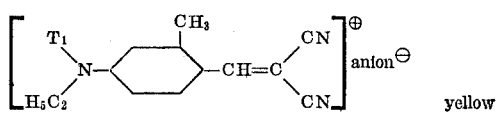

yellow can be prepared by condensing the compound of the formula

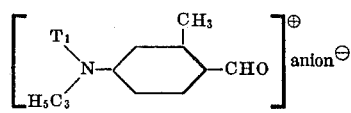

with malonic acid dinitrile. The intermediate used, which corresponds to the formula

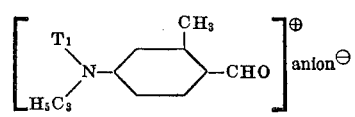

is accessible by an additive reaction of 4-vinylpyridine with N-ethyl-meta-toluidine, followed by a Vilsmeyer reaction and quaternation of the resulting product.

Formulae of representative dyes of the foregoing examples are as follows:

EXAMPLE 5

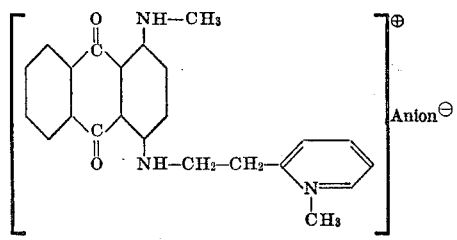

EXAMPLE 8b

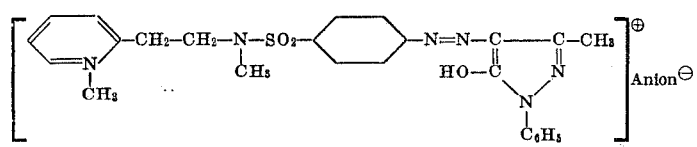

EXAMPLE 21

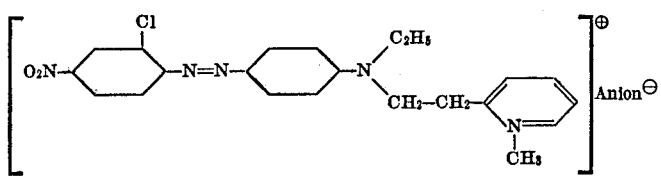

EXAMPLE 23

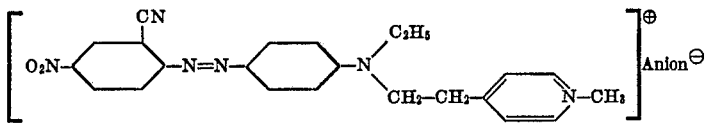

EXAMPLE 26

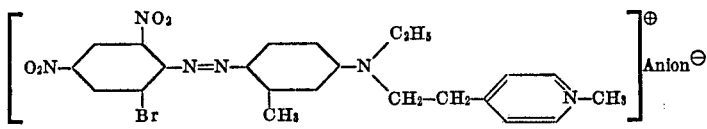

EXAMPLE 29

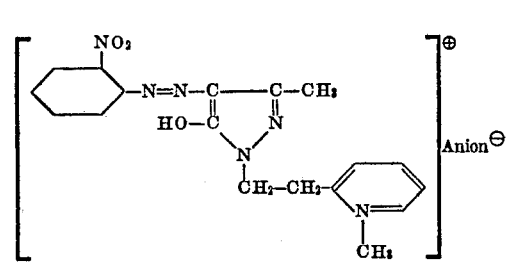

EXAMPLE 37

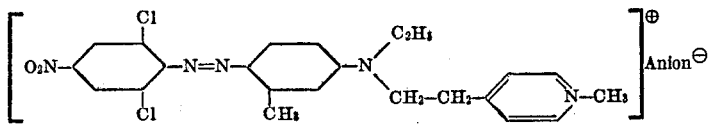

EXAMPLE 43

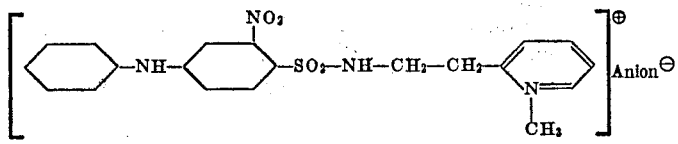

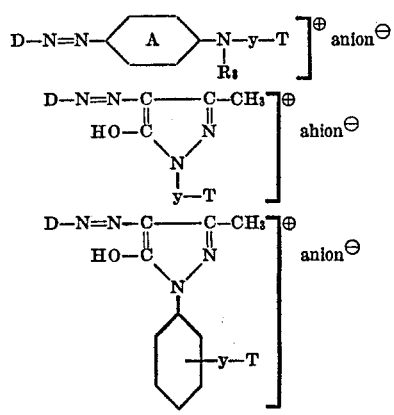

wherein:

D is residue of a diazo component selected from the group consisting of benzene, thiazole and thiadiazole, any substituent on the diazo component being a member selected from the group consisting of halo, nitro, nitrile, carb(lower)alkoxy and azophenyl;

$R_3$ is lower alkyl;

y is a direct bond;

T is a member selected from the group consisting of N-methylpyridinium-2-dimethylene and N-methylpyridinium-4-dimethylene; and anion ⊖ is an anion which satisfies the valence of the dye cation.

2. Basic dye according to claim 1 wherein

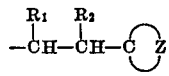

is N-methylpyridinium-2-dimethylene.

3. Basic dye according to claim 1 wherein

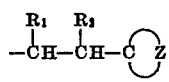

is N-methylpyridinium-4-dimethylene.

Having thus disclosed the invention, what we claim is:

1. Basic azo dye free from sulphonic acid groups and of one of the formulae and

4. The basic dye of the formula

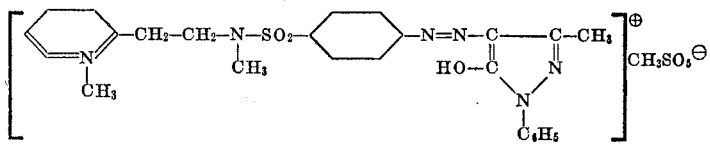

5. The basic dye of the formula

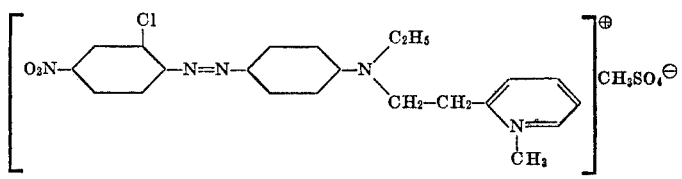

6. The basic dye of the formula

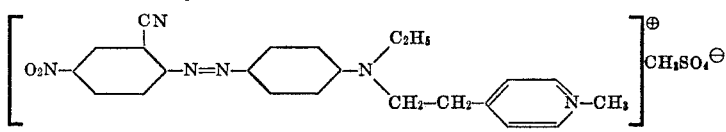

7. The basic dye of the formula

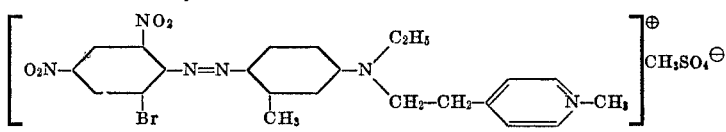

8. The basic dye of the formula

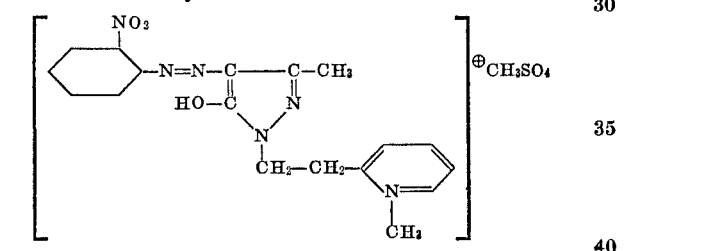

9. The basic dye of the formula

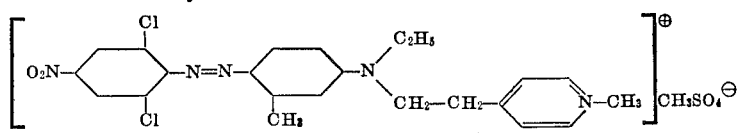

References Cited

UNITED STATES PATENTS

| | | | |
|---|---|---|---|
| 626,936 | 6/1899 | Scholl et al. | 260—156 |
| 1,887,289 | 11/1932 | Conzetti | 260—156 |
| 2,099,525 | 11/1937 | Krzikalla et al. | 260—156 |
| 2,153,012 | 4/1939 | Tatum | 260—272 |
| 2,219,280 | 10/1940 | Graenacher et al. | 260—156 |
| 2,436,428 | 2/1948 | Haddock et al. | 260—156 |
| 3,192,195 | 6/1965 | Coe | 260—156 |
| 3,247,207 | 4/1966 | Etienne et al. | 260—272 |
| 2,234,723 | 3/1941 | Dickey et al. | 260—156 |

OTHER REFERENCES

Ven Kataraman, "The Chemistry of Synthetic Dyes," volume 1, Chapter 5, pp. 240–247, Academic Press, Inc., publishers, New York (1952).

FLOYD D. HIGEL, Primary Examiner

U.S. Cl. X.R.

8—4, 7, 41, 42, 50, 51, 63, 71; 106—288; 117—121, 138.8, 144, 152; 260—37, 41, 41.5, 146, 154, 155, 208, 235, 243, 294.8, 294.9, 296, 328

UNITED STATES PATENT OFFICE
CERTIFICATE OF CORRECTION

Patent No. 3,518,247            Dated June 30, 1970

Inventor(s) RUDOLF ALTERMATT, ROLAND ENTSCHEL and CURT MUELLER

It is certified that error appears in the above-identified patent and that said Letters Patent are hereby corrected as shown below:

Column 1, in the heading, "Technau" should read --Tecknau--. Column 3, line 72, "benzene sulphonic" should read --benzenesulphonic--; line 73, "-nitrobenzene sulphonic" should read -- -nitrobenzenesulphonic--. Column 4, line 13, "glycol" should read --glycol,--; line 14, "meta cresol" should read --meta-cresol--; line 18, ", are" should read --are,--; line 58, "thidiazole" should read --thiadiazole--. Column 5, line 20, "N- should read -- -N- --; line 31, "(VIII)" should read --(VIII) or--; line 53, in the formula, "-C-CH$_2$" should read -- -C-CH$_3$--. Column 6, line 20, in the formula,

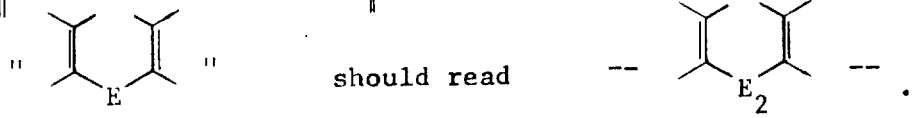

Column 7, line 20, in the formula,

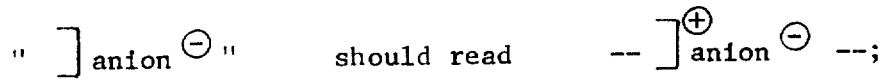

line 46, "Acrylon" should read --Acrylan--; line 48, "pyridine)" should read --pyridine),--; line 49, "Dynel" should read --Dynel,--; line 63, "last" should read --fast--; line 67, "polyolefine" should read --polyolefines--. Column 8, line 40, in the formula,

Column 9, line 12, "quaterated" should read --quaternated--. Column 11, line 7, in the formula,

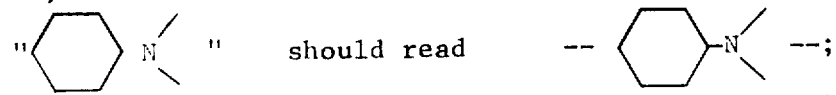

line 47, "4 N" should read --4N--; line 71, in the formula, "-CH$_4$" should read -- -CH$_3$--. Column 12, line 15, in the formula,

UNITED STATES PATENT OFFICE
CERTIFICATE OF CORRECTION

PAGE - 2

Patent No. 3,518,247                           Dated June 30, 1970

Inventor(s) RUDOLF ALTERMATT, ROLAND ENTSCHEL and CURT MUELLER

It is certified that error appears in the above-identified patent and that said Letters Patent are hereby corrected as shown below:

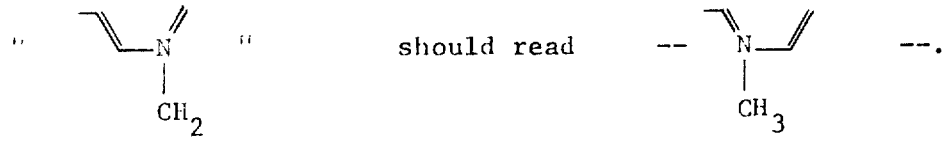

Column 18, line 30, in the formula, "$H_5C_3$" should read --$C_2H_5$--; line 38, in the formula, "$H_5C_3$" should read --$C_2H_5$--. Column 19, line 40, in the formula,

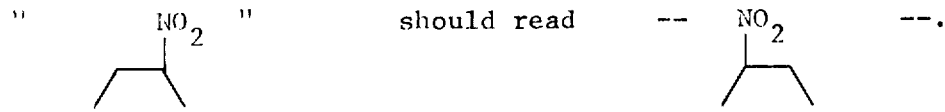

Column 21, in the formula for claim 4,

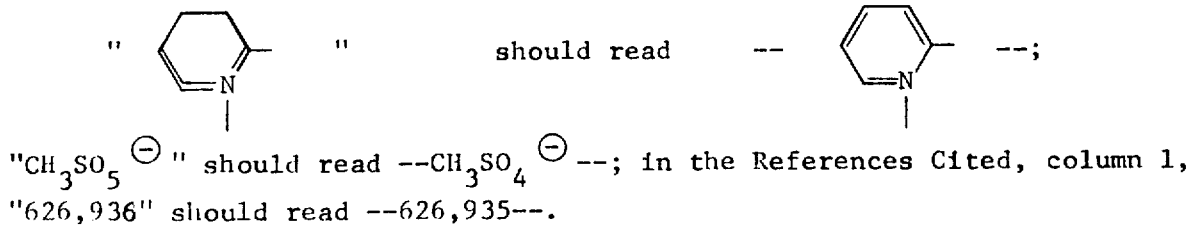

"$CH_3SO_5^\ominus$" should read --$CH_3SO_4^\ominus$--; in the References Cited, column 1, "626,936" should read --626,935--.

Signed and sealed this 10th day of November 1970.

(SEAL)
Attest:

EDWARD M. FLETCHER, JR.                    WILLIAM E. SCHUYLER, JR.
Attesting Officer                          Commissioner of Patents

UNITED STATES PATENT OFFICE
CERTIFICATE OF CORRECTION

Patent No. 3,518,247    Dated June 30, 1970

Inventor(s) RUDOLF ALTERMATT, ROLAND ENTSCHEL and CURT MUELLER

It is certified that error appears in the above-identified patent and that said Letters Patent are hereby corrected as shown below:

Column 5, line 49, in the formula, "$\begin{matrix} R_1 & R_2 \\ | & | \\ -CH-CH-C \end{matrix}$"

should read --$\begin{matrix} R_1 & R_2 \\ | & | \\ -CH-CH-C \end{matrix}$--. Column 20, lines 66 and 73, in the formula of each, "$\begin{matrix} R_1 & R_2 \\ | & | \\ -CH-CH-C \end{matrix} Z$" should read --$C$--.

Signed and sealed this 28th day of December 1971.

(SEAL)
Attest:

EDWARD M. FLETCHER, JR.
Attesting Officer

ROBERT GOTTSCHALK
Acting Commissioner of Patent